(12) United States Patent
Shi et al.

(10) Patent No.: US 11,990,267 B2
(45) Date of Patent: May 21, 2024

(54) THREE-PHASE MAGNETICS ASSEMBLY

(71) Applicant: Astec International Limited, Kowloon (HK)

(72) Inventors: Lei Shi, Kowloon (HK); Yuk Man Shing, Kowloon (HK)

(73) Assignee: Astec International Limited, Kowloon (HK)

( * ) Notice: Subject to any disclaimer, the term of this patent is extended or adjusted under 35 U.S.C. 154(b) by 635 days.

(21) Appl. No.: 17/029,294

(22) Filed: Sep. 23, 2020

(65) Prior Publication Data

US 2022/0093325 A1 Mar. 24, 2022

(51) Int. Cl.
*H01F 27/30* (2006.01)
*H01F 3/14* (2006.01)
(Continued)

(52) U.S. Cl.
CPC ............. *H01F 27/306* (2013.01); *H01F 3/14* (2013.01); *H01F 27/263* (2013.01); *H01F 27/29* (2013.01);
(Continued)

(58) Field of Classification Search
CPC ........ H01F 27/306; H01F 3/14; H01F 27/263; H01F 27/29; H01F 30/12; H01F 27/38;
(Continued)

(56) References Cited

U.S. PATENT DOCUMENTS 5,905,369 A 5/1999 Ishii et al.
7,116,087 B2 10/2006 Zhang et al.
(Continued)

FOREIGN PATENT DOCUMENTS

CN 102655372 B 5/2016
CN 103563232 B 6/2016
(Continued)

OTHER PUBLICATIONS

Bing Lu Ed—Anonymous: "A novel control method for interleaved transition mode PFC", Applied Power Electronics Conference and Exposition, 2008. APEC 2008. Twenty-Third Annual IEEE, IEEE, Piscataway, NJ, USA, Feb. 24, 2008, pp. 697-701.
(Continued)

*Primary Examiner* — Bickey Dhakal
*Assistant Examiner* — Matthew T Sarles

(57) ABSTRACT

A three-phase magnetics assembly comprising a plurality of windings, and a unified core body is provided. The core body includes core legs which extend along central axes of the plurality of windings and around which the plurality of windings are wound such that magnetic fluxes are produced in the plurality of core legs when current flows through the plurality of windings. The plurality of windings comprise first, second, and third phase inductors, and first, second, and third phase transformers, which are positioned about the unified core body such that the core legs of the first phase inductor and second phase transformer share a central axis, the core legs of the second phase inductor and third phase transformer share a central axis, and the core legs of the third phase inductor and first phase transformer share a central axis.

17 Claims, 8 Drawing Sheets

(51) Int. Cl.
*H01F 27/26* (2006.01)
*H01F 27/29* (2006.01)
*H01F 30/12* (2006.01)
*H02M 3/335* (2006.01)

(52) U.S. Cl.
CPC ........ *H01F 30/12* (2013.01); *H02M 3/33592* (2013.01)

(58) Field of Classification Search
CPC .... H01F 27/40; H01F 27/34; H02M 3/33592; H02M 3/003; H02M 3/01; H02M 3/33573; H02M 3/33576
See application file for complete search history.

(56) References Cited

U.S. PATENT DOCUMENTS

| | | | |
|---|---|---|---|
| 8,325,004 B2 | 12/2012 | Nagano et al. | |
| 10,395,819 B2 * | 8/2019 | Wukovits | H02M 3/24 |
| 10,992,230 B1 | 4/2021 | Arcudia | |
| 11,108,329 B1 | 8/2021 | Sigamani | |
| 11,264,908 B1 | 3/2022 | Beltran et al. | |
| 2007/0253223 A1 | 11/2007 | Neidorff et al. | |
| 2007/0253224 A1 | 11/2007 | Cohen et al. | |
| 2013/0121043 A1 | 5/2013 | Pietkiewicz | |
| 2014/0334196 A1 | 11/2014 | Chen et al. | |
| 2016/0020016 A1 | 1/2016 | Ouyang et al. | |
| 2018/0061560 A1 | 3/2018 | Wukovits et al. | |
| 2018/0123443 A1 | 5/2018 | Sreenivas et al. | |
| 2018/0323720 A1 * | 11/2018 | Njiende | H01F 27/38 |

FOREIGN PATENT DOCUMENTS

| | | | |
|---|---|---|---|
| CN | 109036800 | * 12/2018 | ............ H01F 27/24 |
| TW | 200427204 A | 12/2004 | |
| TW | I236207 B | 7/2005 | |
| TW | 201444243 A | 11/2014 | |
| TW | 201523659 A | 6/2015 | |
| TW | I497886 B | 8/2015 | |
| TW | 201711065 A | 3/2017 | |

OTHER PUBLICATIONS

Chris Bridge et al: "Understanding Interleaved Boundary Conduction Mode PFC Converters", Fairchild Semiconductor Power Seminar 2008-2009, Dec. 31, 2009, XP055277250, http://www.mikrocontroller.net/attachment/122761/interleaved_bcm_pfc.pdf.
Extended European Search Report for EP Application No. 21190243.2, dated Jan. 28, 2022; 5 pages.
Extended European Search Report for EP Application No. 21198466.1, dated Feb. 18, 2022; 4 pages.
Hangseok Choi et al: "A Cross-Coupled Master Slave Interleaving Method for Boundary Conduction Mode (BCM) PFC Converters", IEEE Transactions on Power Electronics, vol. 27, No. 10, Oct. 1, 2012, pp. 4202-4211.
Multimode Controller for SMPS, L6566BH; STMicroelectronics, Apr. 2012, 51 pages.
Power Factor Corrector; L6561; STMicroelectronics; 13 pages.
Quasi-Resonant SMPS Controller, L6565; STMicroelectronics, Jan. 2003, 17 pages.
TEA1507; GreenChip II SMPS control IC, Philips, Dec. 2000, 20 pages.
UCC28600 8-Pin Quasi-Resonant Flyback Green-Mode Controller, SLUS656K, Texas Instruments, Aug. 2015, 45 pages.
European Office Action for EP Application No. 21190243.2, dated Dec. 12, 2022; 6 pages.

* cited by examiner

THREE-PHASE MAGNETICS ASSEMBLY

TECHNICAL FIELD

Aspects of the disclosure are related to electronic components and in particular to inductor and transformer components for three-phase power systems.

TECHNICAL BACKGROUND

Three-phase LLC power converters are commonly used in a variety of systems including telecom systems, fast chargers for electric vehicles, and other applications requiring high power density and high efficiency.

These three-phase LLC power converters typically include an inductor/transformer pair for each of the three phases. Since these components must withstand large currents, they are commonly among the largest components within the power converter, and also dissipate energy due to core losses within these components.

OVERVIEW

In an embodiment, a three-phase magnetics assembly is provided. The three-phase magnetics assembly includes a plurality of windings, and a unified core body having a plurality of core legs which each extend in a direction of central axes of the plurality of windings and around which the plurality of windings are wound such that magnetic fluxes are produced in the plurality of core legs when current flows through the plurality of windings.

The plurality of windings comprise first, second, and third phase inductors, and first, second, and third phase transformers, which are positioned about the unified core body such that the core legs of the first phase inductor and second phase transformer share a central axis, the core legs of the second phase inductor and third phase transformer share a central axis, and the core legs of the third phase inductor and first phase transformer share a central axis.

In another embodiment, a unified core body for a three-phase magnetics assembly is provided. The unified core body includes a plurality of core legs which each extend in a direction of central axes of first, second, and third phase inductors, and first, second, and third phase transformers, each having a first and second end, and each configured to provide a magnetic core conducting magnetic flux for one of the first, second, and third phase inductors, and the first, second, and third phase transformers.

The unified core body also includes an inductor return leg, configured to conduct magnetic flux between the first and second ends of the core legs within the inductors, and a transformer return leg, configured to conduct magnetic flux between the first and second ends of the core legs within the transformers.

In a further embodiment, a three-phase magnetics assembly is provided. The three-phase magnetics assembly includes a plurality of windings, a unified core body, an inductor return leg, and a transformer return leg.

The unified core body has a plurality of core legs, each having a first and second end, which each extend in a direction of central axes of the plurality of windings and around which the plurality of windings are wound such that magnetic fluxes are produced in the plurality of core legs when current flows through the plurality of windings, wherein the plurality of windings comprise first, second, and third phase inductors, and first, second, and third phase transformers, which are positioned about the unified core body such that the core legs of the first phase inductor and second phase transformer share a central axis, the core legs of the second phase inductor and third phase transformer share a central axis, and the core legs of the third phase inductor and first phase transformer share a central axis.

The inductor return leg is configured to conduct magnetic flux between the first and second ends of the core legs within the inductors, and the transformer return leg is configured to conduct magnetic flux between the first and second ends of the core legs within the transformers.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The example embodiments described herein illustrate different methods for constructing a three-phase magnetics assembly including a unified core body for use in a three-phase power system.

Figure 1A:
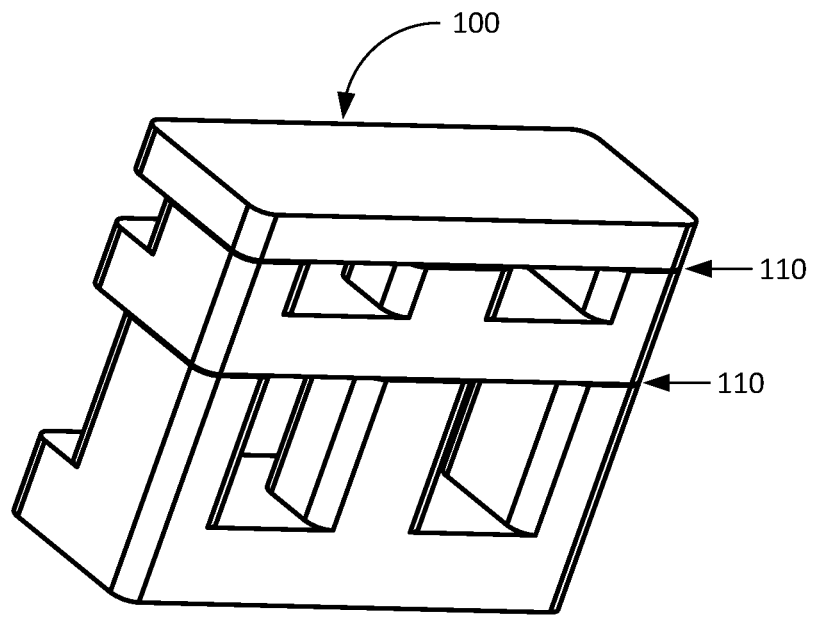
FIGS. 1A, 1B, and 1C illustrate a unified core body for a three-phase magnetics assembly.
Figure 1B:
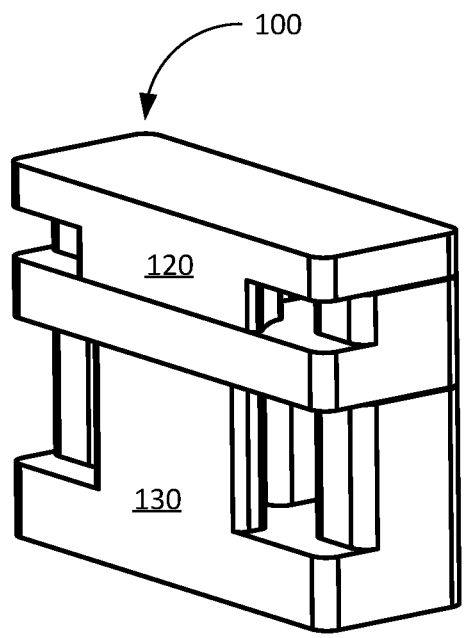
Figure 1C:
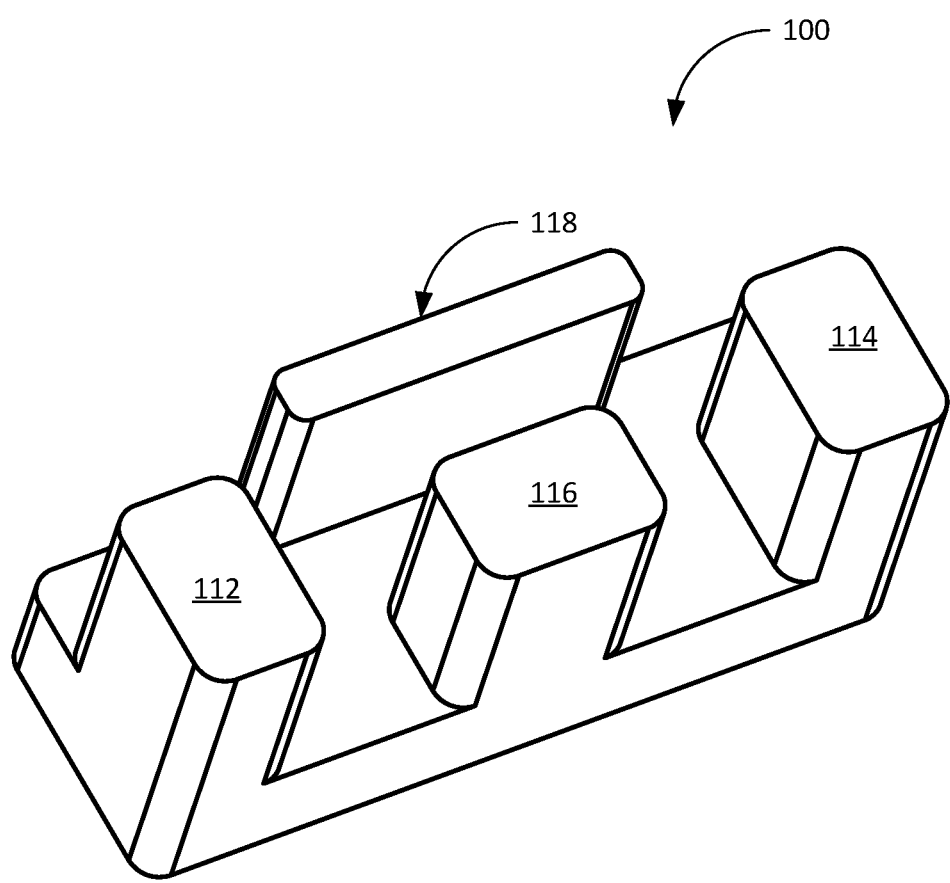

FIGS. 1A, 1B, and 1C illustrate a unified core body 100 for a three-phase magnetics assembly. In these example embodiments, a unified core body 100 is configured to support three inductors and three transformers which are formed by a plurality of windings. Unified core body 100 includes air gaps 110 which influence various parameters of the inductors and transformers supported by the core body 100. Unified core body 100 also includes inductor return leg 120 and transformer return leg 130.

Inductor return leg 120 provides a return path for magnetic flux from the three inductors. Transformer return leg 130 provides a return path for magnetic flux from the three transformers.

In an example embodiment, unified core body 100 has a plurality of core legs (here three are illustrated). Each core leg has a first and second end, which each extend in a direction of central axes of the plurality of windings and around which the plurality of windings are wound such that magnetic fluxes are produced in the plurality of core legs when current flows through the plurality of windings.

FIG. 1C illustrates a lower portion of the unified core body 100 from FIGS. 1A and 1B. In this example embodiment, legs 112, 114, and 116 provide support for, and act as magnetic cores for three transformers which consist of winding around each of legs 112, 114, and 116. A portion of transformer return leg 118 is also illustrated. A similar module is used to provide support for, and act as magnetic cores for the three inductors, and would be positioned above this module during manufacture.

Figure 2A:
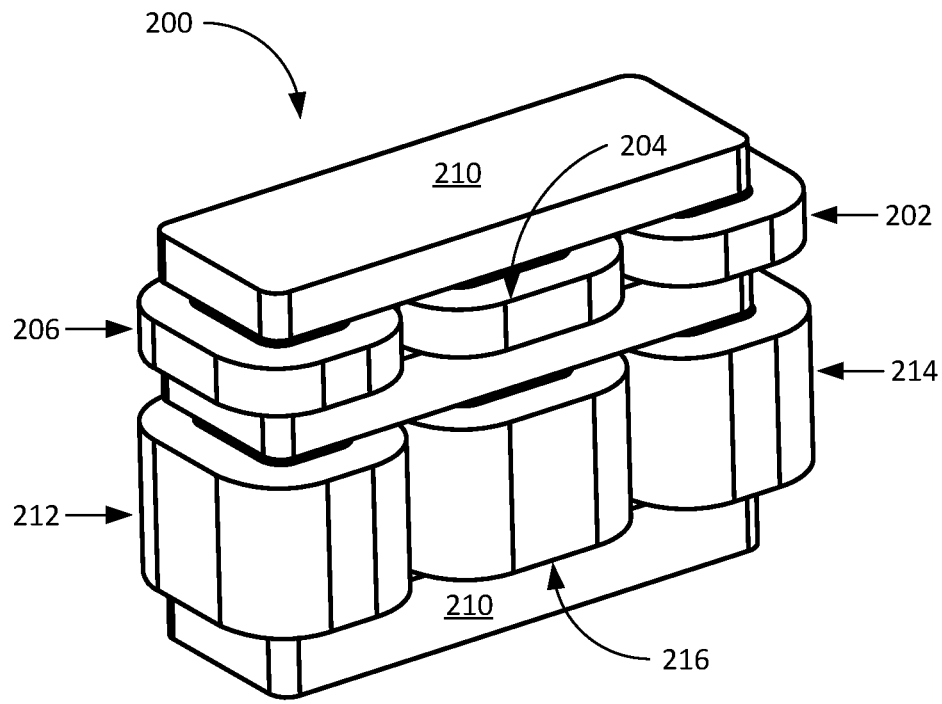
FIGS. 2A and 2B illustrate a three-phase magnetics assembly.
Figure 2B:
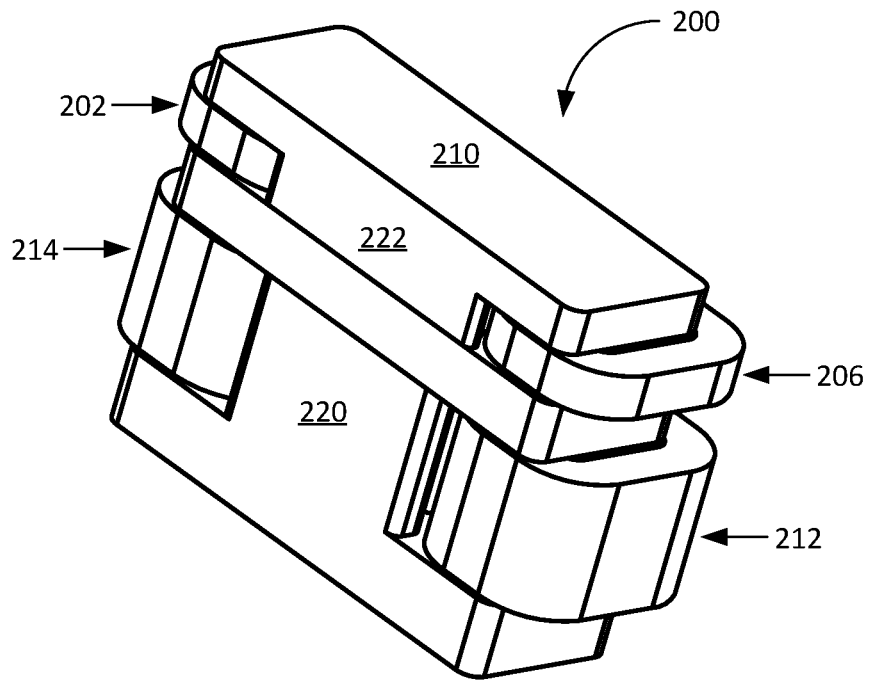

FIGS. 2A and 2B illustrate a three-phase magnetics assembly 200. In this example embodiment unified core body 210 has been populated with three transformers 212, 214, and 216, along with three inductors 202, 204, and 206. FIG. 2B also illustrates inductor return leg 222 and transformer return leg 220.

Figure 3A:
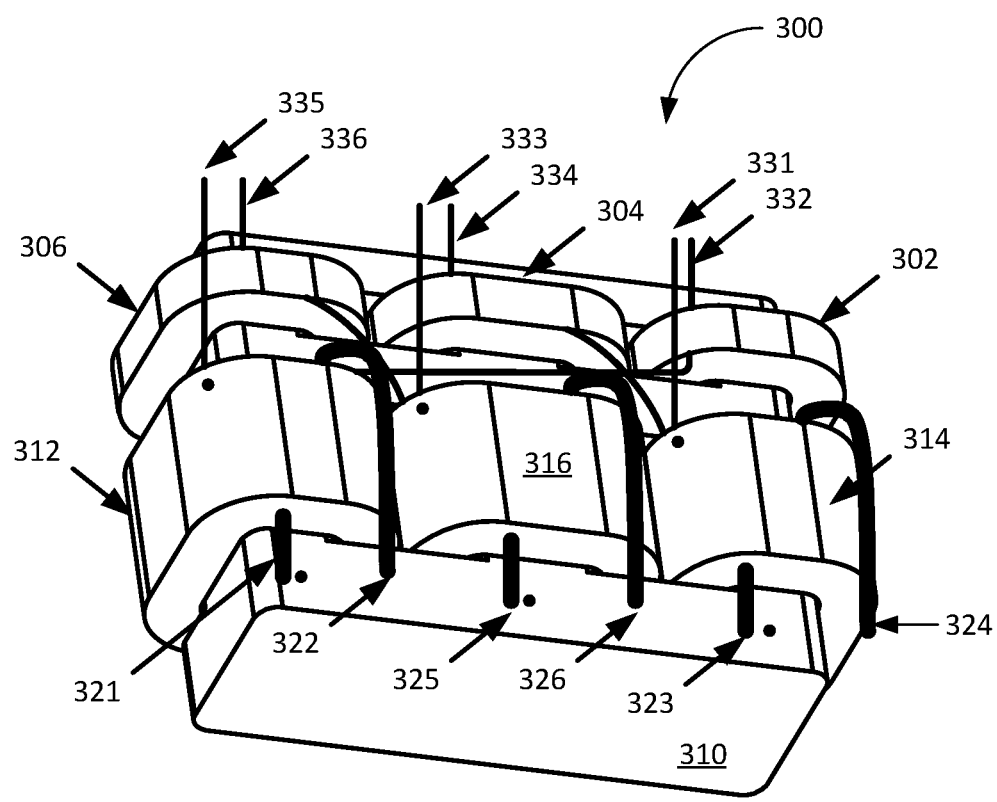
FIG. 3A illustrates a three-phase magnetics assembly.

FIG. 3A illustrates a three-phase magnetics assembly 300. In this example embodiment unified core body 310 has been populated with three transformers 312, 314, and 316, along with three inductors 302, 304, and 306. Here, primary winding outlets 331-336 are illustrated as wires rising to the top of magnetics assembly 300, and secondary winding outlets 321-326 are illustrated as conductors flowing to the bottom of magnetics assembly 300.

In this example embodiment, primary winding outlets 331, 333, and 335 are dot points indicating polarity of the primary windings, and secondary winding outlets 321, 323, and 325 are dot points indicating polarity of the secondary windings.

Figure 3B:
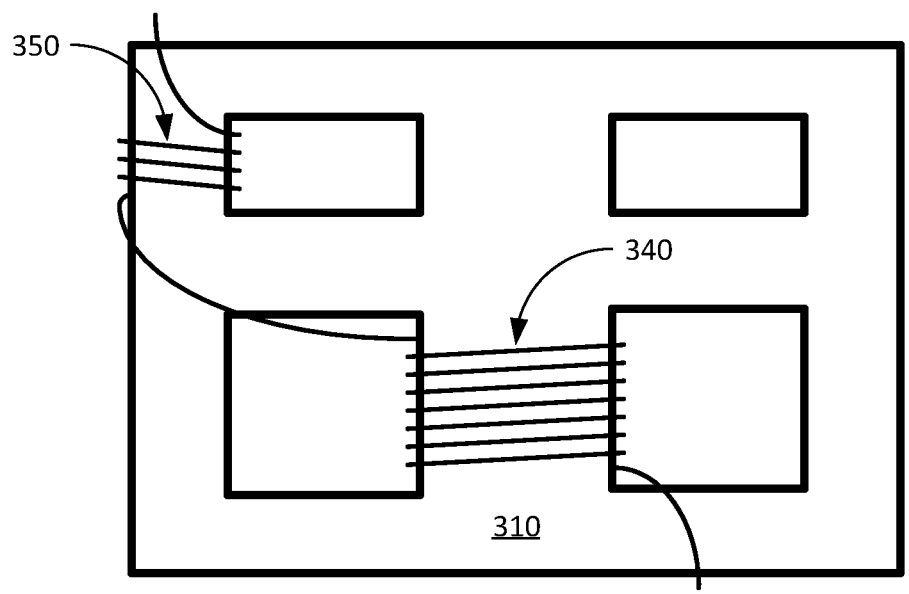
FIG. 3B illustrates an exemplary winding within a three-phase magnetics assembly.

FIG. 3B illustrates an exemplary winding within a three-phase magnetics assembly. In this example embodiment, a single winding is used to construct an inductor 350 and an inner/primary core of a corresponding (same phase) transformer 340 around unified core body 310. Notice that the inductor 350 and transformer 340 are offset from each other on different core legs. This is done to reduce magnetic flux within unified core body 310 and is discussed in detail below with respect to FIGS. 4 and 5.

Figure 4:
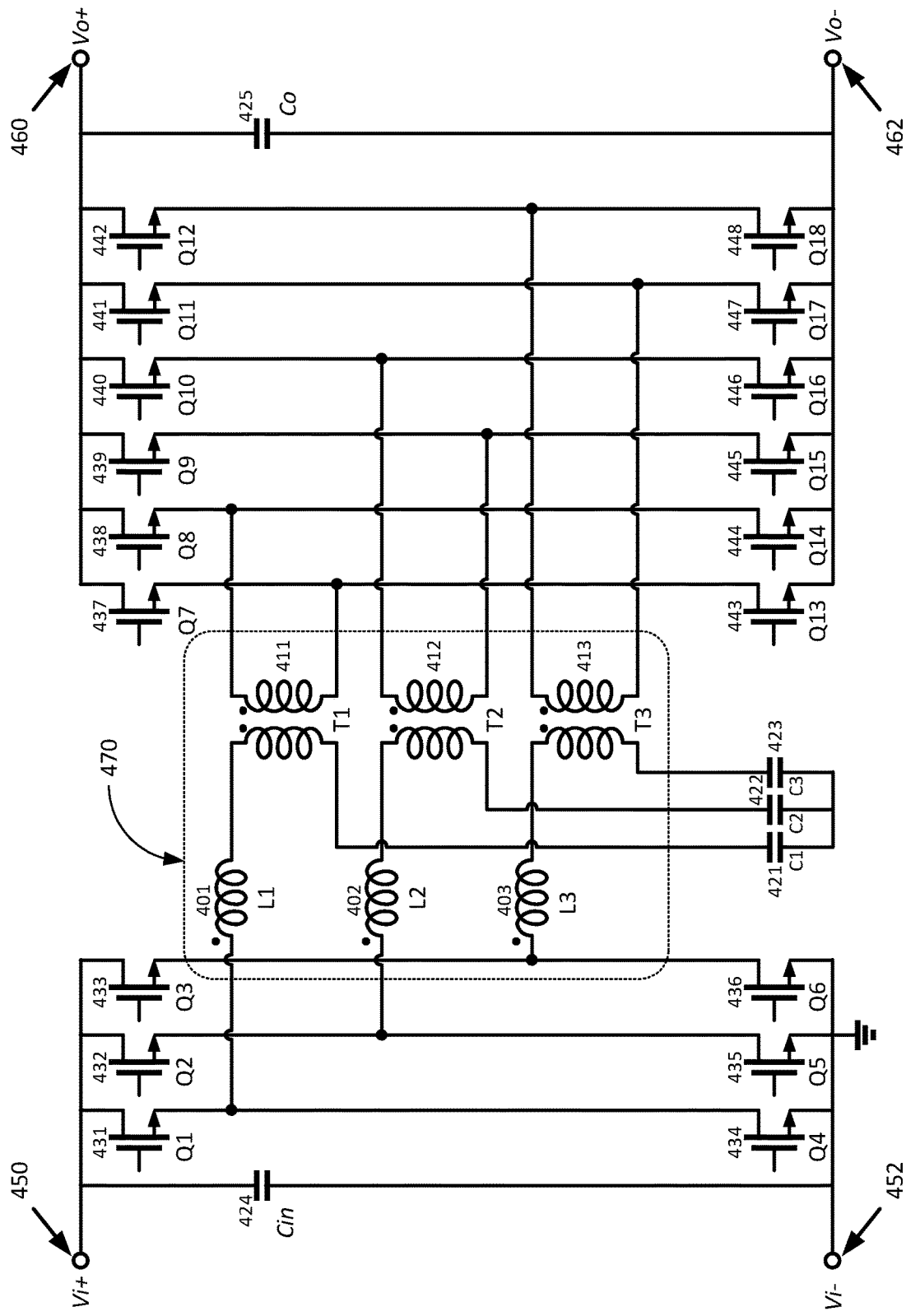
FIG. 4 illustrates an exemplary power converter circuit incorporating a three-phase magnetics assembly.

FIG. 4 illustrates an exemplary power converter circuit incorporating a three-phase magnetics assembly 470. This example embodiment illustrates a portion of a three-phase half-bridge LLC circuit incorporating a three-phase magnetics assembly 470. This is simply one example use of the present invention, as three-phase magnetics assembly 470 may also be used in many other circuits such as full-bridge configurations, other half-bridge configurations, and the like.

This example portion of a power converter circuit includes inputs Vi+ 450 and Vi- 452, input capacitor Cin 424 along with input stage N-FETs 431-436. The power converter also includes three-phase magnetics assembly 470 which incorporated inductors L1 401, L2 402, and L3 403, along with transformers T1 411, T2 412, and T3 413. The output stage includes N-FETs 437-448, output capacitor Co 425 and outputs Vo+ 460 and Vo- 462. The example power converter circuit also includes capacitors C1 421, C2 422, and C3 423. While this example circuit uses N-FETs, other example circuits may use P-FETs, or wide-band-gap parts such as SiC FETs or GaN FETs.

In this example circuit, inductor L1 401 is a first phase inductor, and transformer T1 411 is a first phase transformer. Inductor L2 402 is a second phase inductor, and transformer T2 412 is a second phase transformer. Inductor L3 403 is a third phase inductor, and transformer T3 413 is a third phase transformer. In typical designs these three phases are 120-degrees of phase from each other.

Since the inductors and transformers support large currents, each contributes to some amount of core loss from the magnetic flux within their cores. In order to minimize this core loss all three inductors and three transformers are integrated together into three-phase magnetics assembly 470. A common inductor return leg is provided for the three inductors, and a common transformer return leg is provided for the three transformers, as illustrated in FIGS. 1B, 1C, and 2B. Magnetic flux from the three phases within the single return legs acts to cancel each other out since the phases are separated by 120-degrees, thus reducing core loss within three-phase magnetics assembly 470.

Figure 7:
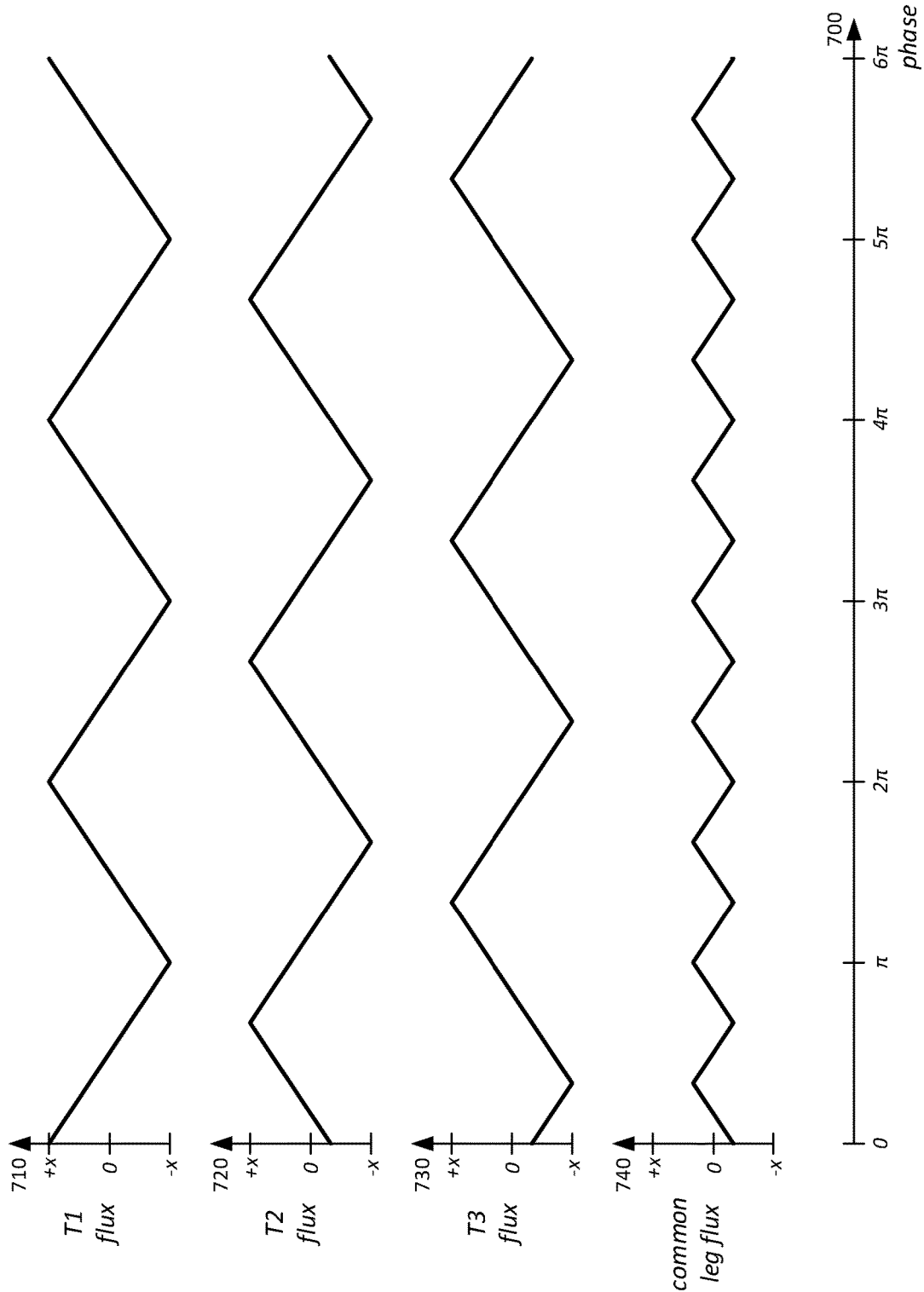
FIG. 7 illustrates magnetic fluxes within each of the transformers and a common return leg within an exemplary power supply circuit incorporating a three-phase magnetics assembly.

In an example embodiment, magnetic flux from each of the three inductors is sinusoidal and offset by 120-degrees, so that the combined magnetic flux from the three inductors cancels itself out to essentially zero. The magnetic flux in each transformer winding is triangular and offset by 120-degrees, so that the combined magnetic flux from the three transformer phases act to cancel each other out, and reduce the magnetic flux within the transformer return leg to ⅓ that of the flux in each individual transformer leg. This cancellation is illustrated in FIG. 7 and discussed in detail below.

Figure 5A:
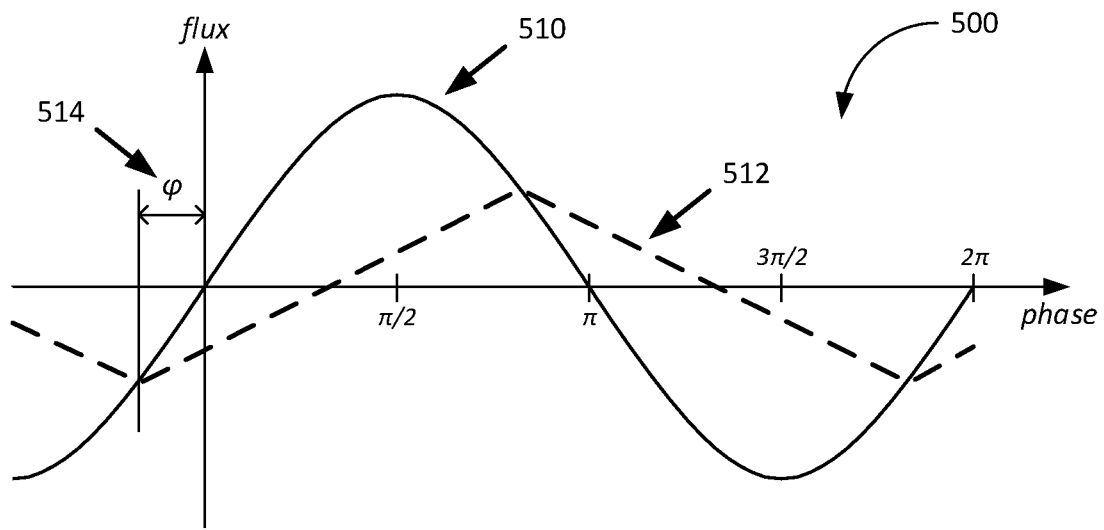
FIG. 5A illustrates the relationship between inductor flux and transformer flux within an exemplary power supply circuit incorporating a three-phase magnetics assembly.

FIG. 5A illustrates the relationship 500 between inductor flux and transformer flux within an exemplary power supply circuit incorporating a three-phase magnetics assembly. In an example embodiment, such as that illustrated in FIG. 4, magnetic flux within the inductors 510 has a sinusoidal shape, while magnetic flux within the transformers 512 has a triangular shape. The transformer magnetizing current lags from the magnetizing current within its corresponding inductor as shown here. The two currents are offset by a phase offset of $\varphi$ 514.

Figure 5B:
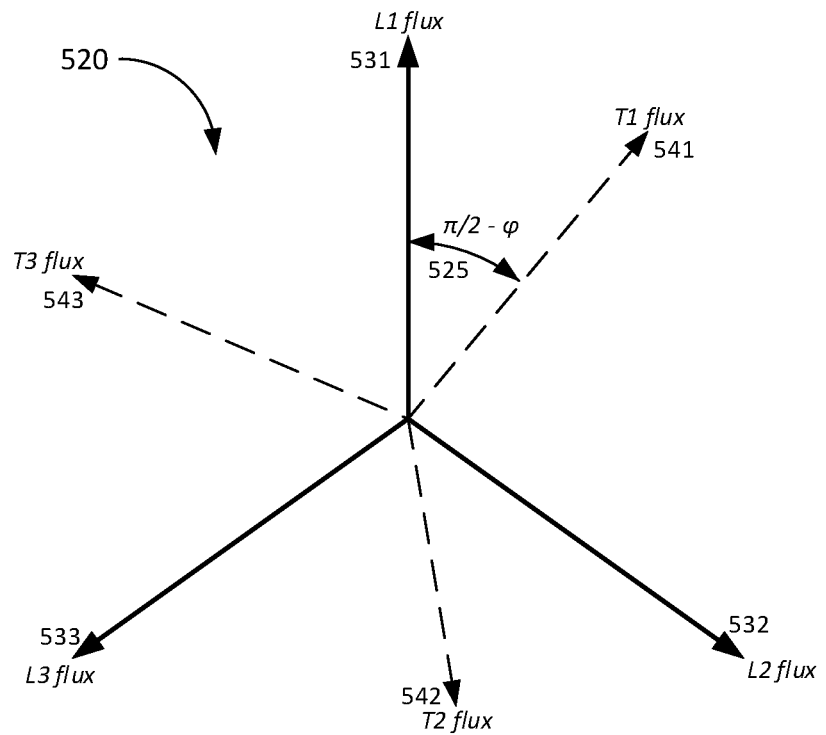
FIG. 5B is a phase diagram illustrating the phase relationship between magnetic fluxes within each of the inductors and transformers within an exemplary power supply circuit incorporating a three-phase magnetics assembly.

This relationship holds true for each of the three phases. Since each phase is offset by 120-degrees or $2\pi/3$, a phase diagram may be constructed for the fluxes within each of the inductors and each of the transformers. FIG. 5B illustrates such a phase diagram.

FIG. 5B is a phase diagram 520 illustrating the phase relationship between magnetic fluxes within each of the inductors and transformers within an exemplary power supply circuit incorporating a three-phase magnetics assembly. In this example, first phase inductor L1 flux 531 is shown as a reference at 0 phase offset, each of the remaining flux components from the remaining inductors and transformers is illustrated with respect to this phase vector. First phase transformer T1 flux 541 is offset from first phase inductor L1 flux 531 by $\pi/2-\varphi$. Second phase inductor L2 flux 532, second phase transformer T2 flux 542, third phase inductor L3 flux 533, and third phase transformer T3 flux 543 are also illustrated on phase diagram 520.

Notice that the fluxes of first phase inductor L1 and second phase transformer T2 are close to being 180-degrees or $\pi$ out of phase. This also holds true for second phase inductor L2 and third phase transformer T3, and for third phase inductor L3 and first phase transformer T1. Because of this phase relationship between the various inductors and transformers, if opposing pairs of devices were to have core legs sharing a central axis, the fluxes of the pair would essentially cancel within the portion of the core between the two devices, and greatly reduce core losses.

Figure 6:
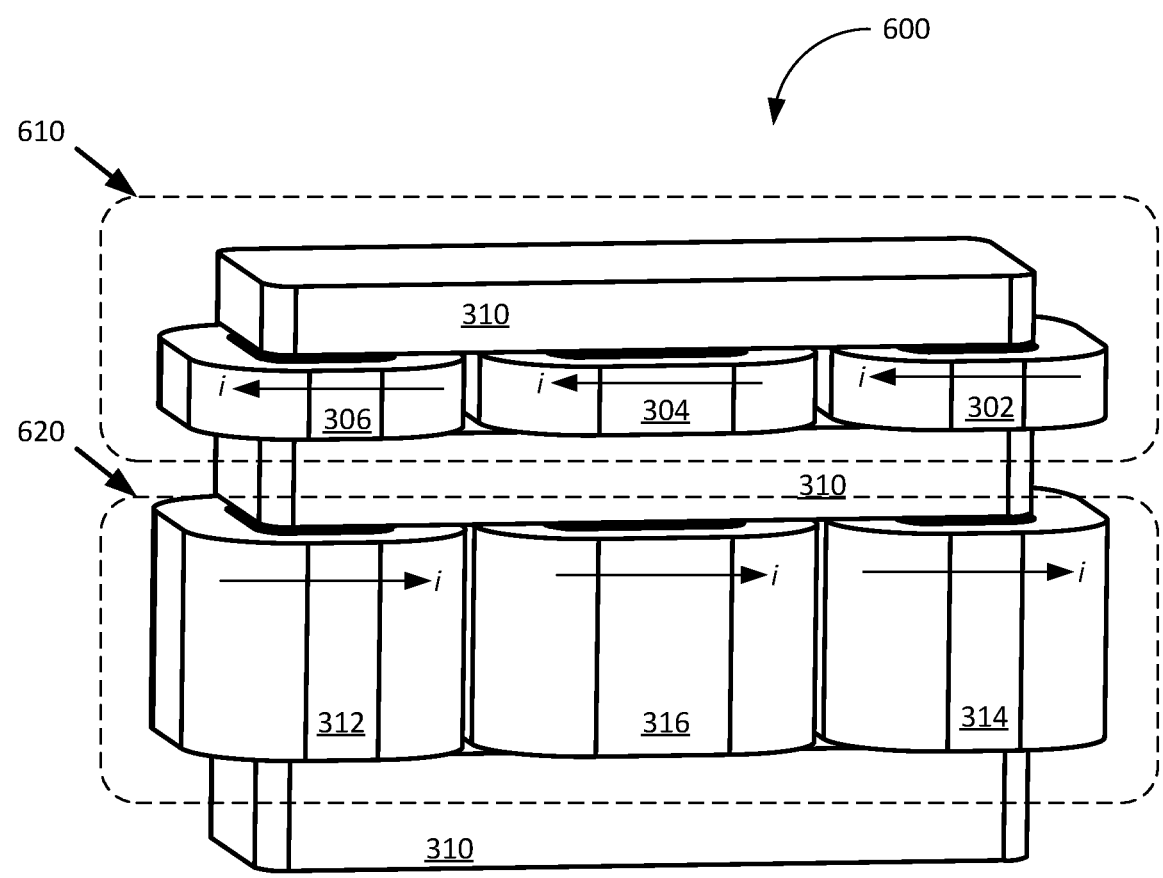
FIG. 6 illustrates a three-phase magnetics assembly.

This pairing of the devices is illustrated in FIG. 6 and discussed in detail below. Winding arrangements such as that illustrated in FIG. 3B are used to accomplish this pairing.

FIG. 6 illustrates a three-phase magnetics assembly 600. In this example embodiment, unified core body 310 incorporates inductors 302, 304, and 306 in an inductor portion 610 of magnetics assembly 600. Unified core body 310 also incorporates transformers 312, 314, and 316 in a transformer portion of magnetics assembly 600.

Here, first phase inductor L1 302 is vertically aligned with and shares a core leg with second phase transformer T2 314. Second phase inductor L2 304 is vertically aligned with and shares a core leg with third phase transformer T3 316. Third phase inductor L3 306 is vertically aligned with and shares a core leg with first phase transformer T1 312. This assembly accomplishes the pairings discussed above with respect to FIG. 5B, and allows the magnetic fluxes of the various components to largely cancel each other out in the portion of unified core body 310 between the inductor portion 610 and the transformer portion 620.

Note that the currents within inductors 302, 304, and 306 are opposite in direction to the currents within transformers 312, 314, and 316, allowing the respective fluxes to cancel each other out in the portion of unified core body 310 between the inductor portion 610 and the transformer portion 620.

FIG. 7 illustrates magnetic fluxes within each of the transformers and a common return leg within an exemplary power supply circuit incorporating a three-phase magnetics assembly. As discussed above with respect to FIG. 4, each transformer has a magnetic flux with a triangular waveform offset from each other by 120 degrees. Here the magnetic flux within first phase transformer T1 is shown in graph 710, the magnetic flux within second phase transformer T2 is shown in graph 720, and the magnetic flux within third phase transformer T3 is shown in graph 730.

When these three magnetic fluxes are combined within a common return leg, the amplitude of the combined fluxes is ⅓ that of each individual transformer with a frequency three time that of the individual transformers. By combining the magnetic fluxes from the three transformers into a single transformer return leg, the amplitude of the flux is reduced by ⅔ and directly reduces core losses in the assembly.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A three-phase magnetics assembly comprising:
a plurality of windings; and
a unified core body having a plurality of core legs which each extend in a direction of central axes of the plurality of windings and around which the plurality of windings are wound such that magnetic fluxes are produced in the plurality of core legs when current flows through the plurality of windings;
wherein the plurality of windings comprise first, second, and third phase inductors, and first, second, and third phase transformers, which are positioned about the unified core body such that the core legs of the first phase inductor and second phase transformer share a central axis, the core legs of the second phase inductor and third phase transformer share a central axis, and the core legs of the third phase inductor and first phase transformer share a central axis; and
wherein a winding direction of the first, second, and third phase inductors is opposite a winding direction of the first, second, and third phase transformers.

2. The three-phase magnetics assembly of claim 1, wherein:
a first one of the plurality of windings comprises the first phase inductor and a primary coil of the first phase transformer;
a second one of the plurality of windings comprises the second phase inductor and a primary coil of the second phase transformer; and
a third one of the plurality of windings comprises the third phase inductor and a primary coil of the third phase transformer.

3. The three-phase magnetics assembly of claim 1, wherein each of the core legs includes an air gap.

4. The three-phase magnetics assembly of claim 1, further comprising:
an inductor return leg, configured to conduct magnetic flux between first and second ends of the core legs within the inductors; and
a transformer return leg, configured to conduct magnetic flux between first and second ends of the core legs within the transformers.

5. The three-phase magnetics assembly of claim 4, wherein currents within the inductors are sinusoidal and magnetic fluxes from each of the three inductors cancel each other within the inductor return leg.

6. The three-phase magnetics assembly of claim 4, wherein currents within the transformers are triangular and magnetic fluxes from each of the three transformers partially cancel each other within the transformer return leg.

7. A unified core body for a three-phase magnetics assembly comprising:
a plurality of core legs which each extend in a direction of central axes of first, second, and third phase inductors, and first, second, and third phase transformers, each having a first and second end, and each configured to provide a magnetic core conducting magnetic flux for one of the first, second, and third phase inductors, and the first, second, and third phase transformers;
a single inductor return leg, configured to conduct magnetic flux between the first and second ends of the core legs within the inductors; and
a single transformer return leg, configured to conduct magnetic flux between the first and second ends of the core legs within the transformersi
wherein a winding direction of the first, second, and third phase inductors is opposite a winding direction of the first, second, and third phase transformers.

8. The unified core body for a three-phase magnetics assembly of claim 7, wherein currents within the inductors are sinusoidal and magnetic fluxes from each of the three inductors cancel each other within the inductor return leg.

9. The unified core body for a three-phase magnetics assembly of claim 7, wherein currents within the transformers are triangular and magnetic fluxes from each of the three transformers partially cancel each other within the transformer return leg.

10. The unified core body for a three-phase magnetics assembly of claim 7, wherein the first, second, and third phase inductors and first, second, and third phase transformers are positioned about the unified core body such that the core legs of the first phase inductor and second phase transformer share a central axis, the core legs of the second phase inductor and third phase transformer share a central axis, and the core legs of the third phase inductor and first phase transformer share a central axis.

11. The unified core body for a three-phase magnetics assembly of claim 10, wherein:
the first phase inductor and a primary coil of the first phase transformer comprise a single winding;
the second phase inductor and a primary coil of the second phase transformer comprise a single winding; and
the third phase inductor and a primary coil of the third phase transformer comprise a single winding.

12. The unified core body for a three-phase magnetics assembly of claim 7, wherein each of the core legs includes an air gap.

13. A three-phase magnetics assembly comprising:
a plurality of windings;
a unified core body having a plurality of core legs, each having a first and second end, which each extend in a direction of central axes of the plurality of windings and around which the plurality of windings are wound such that magnetic fluxes are produced in the plurality of core legs when current flows through the plurality of windings, wherein the plurality of windings comprise first, second, and third phase inductors, and first, second, and third phase transformers, which are positioned about the unified core body such that the core legs of the first phase inductor and second phase transformer share a central axis, the core legs of the second phase inductor and third phase transformer share a central axis, and the core legs of the third phase inductor and first phase transformer share a central axis;
an inductor return leg, configured to conduct magnetic flux between the first and second ends of the core legs within the inductors; and
a transformer return leg, configured to conduct magnetic flux between the first and second ends of the core legs within the transformers;
wherein a winding direction of the first, second, and third phase inductors is opposite a winding direction of the first, second, and third phase transformers.

14. The three-phase magnetics assembly of claim 13, wherein:
a first one of the plurality of windings comprises the first phase inductor and a primary coil of the first phase transformer;
a second one of the plurality of windings comprises the second phase inductor and a primary coil of the second phase transformer; and
a third one of the plurality of windings comprises the third phase inductor and a primary coil of the third phase transformer.

15. The three-phase magnetics assembly of claim 13, wherein each of the core legs includes an air gap.

16. The three-phase magnetics assembly of claim 13, wherein currents within the inductors are sinusoidal and magnetic fluxes from each of the three inductors cancel each other within the inductor return leg.

17. The three-phase magnetics assembly of claim 13, wherein currents within the transformers are triangular and magnetic fluxes from each of the three transformers partially cancel each other within the transformer return leg.

* * * * *